United States Patent [19]

Tsushima et al.

[11] Patent Number: 4,913,817

[45] Date of Patent: Apr. 3, 1990

[54] REINFORCED ION EXCHANGE MEMBRANE AND A PROCESS FOR PRODUCING THE SAME

[75] Inventors: Sakae Tsushima, Yokohama; Tadashi Inoue, Fujisawa, both of Japan

[73] Assignee: Asahi Kasei Kogyo Kabushiki Kaisha, Osaka, Japan

[21] Appl. No.: 207,965

[22] Filed: Jun. 17, 1988

[30] Foreign Application Priority Data

Jun. 19, 1987 [JP] Japan .................................. 62-151236

[51] Int. Cl.$^4$ ....................... B01D 13/00; B01D 13/04
[52] U.S. Cl. .................................. 210/500.27; 204/98
[58] Field of Search .................. 204/98, 12, 252, 296, 204/263, 266, 283; 210/500.21, 500.22, 500.27, 500.28, 500.33, 500.4, 500.41

[56] References Cited

FOREIGN PATENT DOCUMENTS 0031724 8/1984 European Pat. Off. .

*Primary Examiner*—Frank Sever

[57] ABSTRACT

An ion exchange membrane reinforced by a woven reinforcing fabric is provided in which the difference between the thickness of the membrane at the crossover points where the warp and weft strands of the fabric cross each other and that at the window portions defined by the crossed warp and weft strands is not greater than 35 μm. This membrane may be produced for example, by heating an assembly comprising at least two fluorinated polymer films each having pendant sulfonyl groups and/or carboxyl groups in a melt-fabricable form, and a woven reinforcing fabric sandwiched between the polymer films, and a support sheet laminated to the outermost polymer film, while applying a negative pressure to one side of the assembly that is remote from the support film, followed by converting the sulfonyl and/or carboxyl groups of the polymer films to sulfonate and/or carboxylate groups. This reinforced ion exchange membrane has flat film surfaces, thereby eliminating the danger of gas bubbles during chloralkali electrolysis which enables the cell voltage to be low, so that electric power consumption can be reduced.

12 Claims, No Drawings

REINFORCED ION EXCHANGE MEMBRANE AND A PROCESS FOR PRODUCING THE SAME

BACKGROUND OF THE INVENTION

1. Field of the Invention

The present invention relates to a reinforced ion exchange membrane and a process for producing the same. More particularly, the present invention is concerned with a reinforced ion exchange membrane comprising a fluorinated ion exchange resin and a woven reinforcing fabric, in which the difference between the thickness of the membrane at the crossover points of the warp and weft strands of the fabric and that at the window portions of the fabric which are defined by the crossed warp and weft strands, is in a limited range. The present membrane is advantageously reinforced for use in separating the anode and cathode compartments of an electrolytic cell, especially a chloralkali electrolytic cell, which not only contributes to a lowered electric power consumption but also enables the operating voltage to be lowered. The present invention is also concerned with a process for producing an advantageous membrane in which an assembly comprising at least two melt-fabricable fluorinated polymer films, a support sheet superimposed on the films and a woven reinforcing fabric sandwiched between the films is heated while applying a negative pressure to one side of the assembly remote from the support sheet.

2. Discussion of Related Art

It is well known in the art that a cation exchange membrane of a fluorinated polymer having carboxylate and/or sulfonate groups can be advantageously employed to separate the anode and cathode compartments of an electrolytic cell, especially a chloralkali electrolytic cell. Naturally, the cation exchange membrane for use in this field of application must exhibit low power consumption and must have high mechanical strength such that the membrane is not damaged during the installation into a cell and the electrolytic operation. However, generally, the tear strength of a fluorinated polymer film is low, so that the film per se cannot endure being used in an electrolytic operation for a prolonged period of time. Accordingly, a countermeasure has been taken, in which a reinforcing material such as a woven reinforcing fabric is encapsulated in a fluorinated polymer film to thereby improve the tear strength of the film. This countermeasure is however often encountered with various problems. One of the problems is the current shielding which is attributed to the ion impermeability that is inherent of the woven reinforcing fabric. Another problem is that the thickness of the membrane becomes large at the crossover points, the points where the warp and weft strands of the woven reinforcing fabric cross (hereinafter often simply referred to as "crossover points"), due to the encapsulation of the fabric, which causes regions of high electrical resistance to be formed in the membrane. A further problem is that the thickness of the membrane becomes small at the window portions of the membrane, which are defined by the crossed warp and weft strands of the woven reinforcing fabric, which causes concave portions to be formed on the surface of the membrane, in which concave portions gas bubbles are trapped in the membrane for separating the anode and cathode compartments of an electrolytic cell, during the use of the cell in an electrolytic operation, thereby causing the cell voltage to be disadvantageously increased.

To cope with these problems, a process has been proposed in EP-A-O 031 724. In the proposed process, at least two films of melt-fabricable fluorinated polymer having pendant sulfonyl and/or carboxyl groups in a melt-fabricable form and a woven reinforcing fabric are brought into face-to-face contact such that proximate surfaces of two of the films contact opposite planar surfaces of the fabric, and air is removed from between the films at the two opposite edge portions thereof, followed by heat application to the two outermost opposite planar film surfaces. The membrane thus produced is subjected to a conversion reaction to convert the sulfonyl and/or carboxyl groups to an ion exchange form. With respect to the membrane produced according to this method, each window portion has a relatively uniform thickness but the difference between the thickness of the membrane at the crossover points where the membrane has the maximum thickness and that at the window portions where the membrane has the minimum thickness is so disadvantageously large that a flat membrane surface cannot be obtained. This is attributed to the fall of the fluorinated polymer film into the window portions to produce the above-mentioned thickness difference results, which fall would occur due to the differential pressure during the step of removing air from between the films. Consequently, when the membrane produced according to EP-A-O 031 724 is used to separate the anode and cathode compartments of a chloralkali electrolytic cell, hydrogen gas bubbles are likely to be trapped in the concave portions of the membrane surface on the side of the cathode compartment, thereby causing the electric power consumption to disadvantageously increase.

SUMMARY OF THE INVENTION

The present inventors have made extensive and intensive studies with a view toward developing an ion exchange membrane free from the aforementioned drawbacks of the prior art, i.e. an ion exchange membrane which, despite the encapsulation of a woven fabric in the membrane, would still have a flat membrane surface, thereby eliminating the danger of trapping gas bubbles and enabling cell voltage to be low, so that electric power consumption can be lowered. As a result, it has been found that a desirable ion exchange membrane in which the difference between the thickness of the membrane at the crossover points and that at the window portions is small can be obtained by a process in which an assembly comprising at least two melt-fabricable fluorinated polymer films, a support sheet super-imposed on the films and a woven reinforcing fabric sandwiched between the films is heated while applying a negative pressure to one side of the assembly that is remote from the support sheet. The present invention has been accomplished on the basis of this novel finding.

It is, therefore, an object of the present invention to provide a novel ion exchange membrane which, despite the encapsulation of a woven fabric in the membrane, would still have a flat membrane surface, thereby eliminating the danger of trapping gas bubbles and enabling cell voltage to be low, so that electric power consumption can be small.

It is another object of the present invention to provide a novel process for producing an ion exchange membrane having the above characteristics.

The foregoing and other objects, features and advantages of the present invention will be apparent from the following detailed description and appended claims.

DETAILED DESCRIPTION OF THE INVENTION

In one aspect of the present invention, there is provided a reinforced ion exchange membrane comprising at least two layers of a fluorinated polymer having pendant sulfonate and/or carboxylate groups and a woven reinforcing fabric comprising warp and weft strands, said warp and weft strands crossing each other to form crossover points and form window portions defined by the crossed warp and weft strands, said fabric being encapsulated in at least one of said layers of the membrane, wherein the difference between the thickness of the membrane at said crossover points and that at said window portions is not greater than 35 $\mu$m.

The ion exchange membrane of the present invention is reinforced by a woven fabric essentially consisting of warp and weft strands, and is characterized by having an extremely small difference, i.e., not greater than 35 $\mu$m, between the thickness of the membrane at the crossover points of the warp and weft strands and that at the window portions defined by the crossed warp and weft strands so that the surfaces of the membrane are flat. When the present ion exchange membrane is employed to separate the anode and cathode compartments of a chloralkali electrolytic cell, the trapping of gas bubbles on the membrane is remarkably alleviated due to the flatness of the surfaces of the membrane, so that electric power consumption is advantageously reduced.

In order to examine how the difference between the thickness of the membrane at the crossover points and that at the window portions has an effect on the cell voltage during electrolysis, tests were conducted using a chloralkali electrolytic cell having a cathode-to-anode distance as large as about 40 mm so as to avoid any influence due to the trapping of the gas bubbles. As a result, it was confirmed that, when the present membrane having a thickness difference of not greater than 35 $\mu$m between the crossover points and the window portions is used, the cell voltage is advantageously lower than when the conventional membrane having a thickness difference of greater than 35 $\mu$m between the crossover points and the window portions. The reason for the above-mentioned lowering in cell voltage has not yet been elucidated. However, it is believed that the lowering in cell voltage is attributed to a decrease in high resistance regions and a decrease in interfacial concentration.

As described above, the present ion exchange membrane is sufficiently reinforced by a woven fabric comprising warp and weft strands, nevertheless, the difference between the thickness of the membrane at the crossover points and that at the window portions is extremely small so that both surfaces of the membrane are flat. Therefore, when the present membrane is used to separate the anode and cathode compartments of a chloralkali electrolytic cell, the trapping of gas bubbles on the membrane is alleviated. Further, the use of the present membrane leads to a lowering in cell voltage. Accordingly, power saving can be attained by the use of the present ion exchange membrane.

The thickness of the present ion exchange membrane is not critical. However, it is generally in the range of from about 50 to 500 $\mu$m, preferably from about 150 to 250 $\mu$m.

The features of the reinforced ion exchange membrane of the present invention will become more apparent from the description made in connection with the production of the membrane.

The method for producing the above-defined advantageous ion exchange membrane of the present invention is not specifically limited. However, the ion exchange membrane of the present invention can be easily obtained by a unique process as described hereinbelow.

Accordingly, in another aspect of the present invention, there is provided a process for producing a reinforced ion exchange membrane comprising the steps of:

(1) providing a first and a second sheet material, said first sheet material comprising a support sheet and, laminated thereto, at least one film layer of a melt-fabricable fluorinated polymer having pendant sulfonyl and/or carboxyl groups in a melt-fabricable form, said second sheet material comprising a film of a melt-fabricable fluorinated polymer having pendant sulfonyl and/or carboxyl groups in a melt-fabricable form;

(2) sandwiching a woven reinforcing fabric comprising warp and weft strands between said first sheet material and said second sheet material in a manner such that the fabric contacts the polymer film layer of the first sheet material and contacts the polymer film of the second sheet material, said warp and weft strands crossing each other to form crossover points and form window portions defined by the crossed warp and weft strands;

(3) heating the resultant assembly of the first sheet material, the fabric and the second sheet material while applying a negative pressure to one side of the second sheet material that is remote from the support sheet, thereby performing encapsulation of the fabric into the polymer film layer of said first sheet material, the polymer film of said second sheet material or the film of each of said first sheet material and said second sheet material;

(4) removing said support sheet from the assembly, thereby obtaining a precursor membrane comprising the polymer film layer derived from said first sheet material, said second sheet material laminated to said polymer film layer and said reinforcing fabric encapsulated into said polymer film layer of said first sheet material, the polymer film of said second sheet material or the film of each of said first sheet material and said second sheet material, wherein the difference between the thickness of the membrane at the crossover points and that at the window portions is not greater than 35 $\mu$m; and (5) converting the sulfonyl groups, carboxyl groups or a mixture thereof of the precursor membrane to sulfonate groups, carboxylate groups or a mixture thereof.

The above-mentioned process for producing a reinforced ion exchange membrane having flat surfaces is characterized by heating an assembly of a first sheet material comprising a support sheet and at least one fluorinated polymer film layer having pendant sulfonyl groups and/or carboxylate groups in melt-fabricable form which film layer is laminated to said support film, a second sheet material of a fluorinated polymer film of the same type as mentioned above and a woven reinforcing fabric sandwiched between the first sheet material and the second sheet material in a manner such that the fabric contacts the film layer of the first sheet material and contacts the film of the second sheet material, while applying a negative pressure to one side of the second sheet material that is remote from the support sheet at a temperature and for a period of time sufficient to perform encapsulation of the fabric into the polymer film layer of the first sheet material and/or the polymer film of the second sheet material, followed by conversion of the sulfonyl groups and/or carboxyl groups to sulfonate groups and/or carboxylate groups.

The term "fluorinated polymer" as used herein is intended to define a polymer comprising a main chain of a fluorinated hydrocarbon, e.g., olefin type compounds having side chains containing sulfonyl groups and/or carboxyl groups in a melt-fabricable form. A general process for producing the fluorinated polymer will now be described, but the description given hereinbelow is never intended to limit the scope of the present invention.

The fluorinated polymer may be produced by copolymerizing at least one monomer selected from group I defined below and at least one monomer selected from groups II and III also defined below.

Monomers of group I include fluorinated vinyl compounds such as vinyl fluoride, hexafluoropropylene, vinylidene fluoride, trifluoroethylene, chlorotrifluoroethylene, perfluoro(alkyl vinyl ether) and tetrafluoroethylene. When the ultimate membrane is used as a membrane for chloralkali electrolysis, the monomers of group I are preferably chosen from fluorinated monomers containing no hydrogen atom, such as tetrafluoroethylene, perfluoro(alkyl vinyl ether) and hexafluoropropylene.

Monomers of group II include vinyl compounds having functional groups capable of being converted to carboxylate type ion exchange groups. Generally, monomers of group II are represented by the formula:

$$CF_2=CF\text{+}OCF_2-CF)_s-O\text{+}CF\text{+}_t COOR,$$
$$\quad\quad\quad\quad\quad\ \ |\quad\quad\ \ |$$
$$\quad\quad\quad\quad\quad\ Y\quad\quad\ Z$$

wherein s is 0, 1 or 2; t is an integer of from 1 to 12; Y and Z each independently represent F or $CF_3$; and R represents a lower alkyl. Of these, preferable monomers include compounds represented by the formula:

$$CF_2=CF\text{+}OCF_2-CF\text{+}_n O\text{+}CF_2\text{+}_m COOR$$
$$\quad\quad\quad\quad\quad\ \ |$$
$$\quad\quad\quad\quad\quad\ Y$$

wherein n is 0, 1, or 2; m is 1, 2, 3 or 4; Y represents F or $CF_3$; and R represents $CH_3$, $C_2H_5$ or $C_3H_7$.

Particularly, when the ultimate membrane is used as a membrane for chloralkali electrolysis, the monomer of group II is preferably a perfluorinated compound. However, it is not necessary that the group R (lower alkyl) be perfluorinated because it is eliminated when the functional groups are converted to ion exchange groups. Examples of such preferable perfluorinated compounds include $CF_2=CFOCF_2CF(CF_3)OCF_2COOCH_3$, $CF_2=CFOCF_2CF(CF_3)O(CF_2)_2COOCH_3$, $CF_2=CF[OCF_2CF(CF_3)]_2O(CF_2)_2COOCH_3$, $CF_2=CFOCF_2CF(CF_3)O(CF_2)_3COOCH_3$, $CF_2=CFO(CF_2)_2COOCH_3$, and $CF_2=CFO (CF_3)_3COOCH_3$.

Monomers of group III include vinyl compounds having functional groups capable of being converted to sulfonate type ion exchange groups. Such vinyl compounds may be represented by the formula:

$$CF_2=CF-T_KCF_2SO_2F$$

wherein T is a bifunctional fluorinated group having 1 to 8 carbon atoms and K is 0 or 1. The above-mentioned bifunctional fluorinated group (T) may have a chlorine atom as a substituent. In this group, a hydrogen atom or hydrogen atoms may remain intact. However, when the ultimate membrane is used as a membrane for chloralkali electrolysis, it is preferred that all of the hydrogen atoms be replaced with fluorine atoms or with fluorine atoms together with chlorine atoms. The most desirable polymer is a perfluorinated polymer containing no carbon-hydrogen bond or carbon-chlorine bond, which polymer exhibits excellent resistance to harsh conditions.

Further, the above-mentioned bifunctional fluorinated group (T) may be branched or unbranched (i.e. straight chain), and may have one or more ether bonds. It is preferred that the vinyl groups of the monomer be bonded with the above-mentioned group T through an ether bond. For example, monomers represented by the formula:

$$CF_2=CFOTCF_2-SO_2F$$

are preferably used.

Examples of the above-mentioned monomers containing sulfonyl fluoride groups include $CF_2=CFOCF_2CF_2SO_2F$, $CF_2=CFOCF_2CF(CF_3)-OCF_2CF_2SO_2F$, $CF_2=CFOCF_2CF(CF_3)-OCF_2CF_2CF_2SO_2F$, $CF_2=CFO[CF_2CF(CF_3)O]_2-CF_2CF_2SO_2F$, $CF_2=CF(CF_2)_2SO_2F$, and $CF_2=CFOCF_2CF(CF_2OCF_3)-OCF_2CF_2SO_2F$.

Of these, particularly preferable are $CF_2=CFOCF_2CF(CF_3)-OCF_2CF_2CF_2SO_2F$ and $CF_2=CFOCF_2CF(CF_3)-OCF_2CF_2SO_2F$.

The copolymer to be used in the present invention may be produced from the above-mentioned monomers in accordance with the conventional practice of homopolymerization or copolymerization of a fluorinated ethylene, especially tetrafluoroethylene.

For example, the copolymer to be used in the present invention may be produced, as disclosed in U.S. Pat. No. 3,041,317, by a non-aqueous method in which polymerization is performed in the presence of a radical initiator, such as a perfluorocarbon peroxide and an azo compound, at a temperature of 0 to 200° C. under a pressure of 1 to 200 atm, using as a solvent an inert liquid such as a perfluorohydrocarbon and a chlorofluorocarbon.

In conducting copolymerization, the types and proportions of the employed of groups I, II and III monomers are chosen according to the types and amounts of functional groups to be contained in the final fluorinated polymer.

For example, when a polymer containing only carboxylic ester functional groups is desired, at least one monomer selected from the monomers of group I is used together with at least one monomer selected from the monomers of group II. When a polymer containing both of carboxylic ester groups and sulfonyl fluoride groups is desired, at least one monomer selected from the monomers of group I is used together with at least one monomer selected from the monomers of group II and at least one monomer selected from the monomers of group III. Further, a copolymer of monomers from groups I and II and a copolymer of monomers from groups I and III may be blended together to obtain a copolymer to be used in the present invention.

The proportions of the monomers employed are selected according to the required amount of functional groups per unit of the final polymer. When the amount of functional groups is increased, the amounts of monomers of groups II and III are to be increased. The proportions of monomers from groups II and III are generally selected in such a manner that the ion exchange capacity becomes 0.5 to 2.0 meq./g (milliequivalent/g), preferably 0.7 to 1.5 meq./g, after conversion of the total amount of functional groups to ion exchange groups.

The membrane of the present invention may be produced using films obtained by molding a fluorinated polymer having functional groups in melt-fabricable form which are convertible to cation exchange groups.

Molding of the polymer into a film to be used in the present invention can be performed in accordance with conventional practices. The thickness of the film of the polymer is generally in the range of from about 7 $\mu$m to about 150 $\mu$m.

In the ion exchange membrane of the present invention, the types of ion exchange groups, ion exchange capacity, film thickness, number of films and lamination order of films may be varied according to the usage, application conditions, etc.

The woven reinforcing fabric to be used in the present invention consists essentially of warp and weft strands prepared from a monofilament or multifilament yarn of a fluorinated polymer as a reinforcing yarn and, if desired, a monofilament or multifilament yarn of a synthetic or regenerated filament as a sacrificial yarn. The reinforcing yarn may be prepared from a polymer having a carbon chain and having its all hydrogen atoms replaced with fluorine atoms or with fluorine and chlorine atoms. When the ultimate membrane is used in chloralkali electrolysis, it is preferred that the reinforcing yarn be prepared from a homopolymer or copolymer of at least one member selected from the group consisting of tetrafluoroethylene, hexafluoropropylene, perfluoro(alkyl vinyl ether) wherein the alkyl moiety has 1 to 10 carbon atoms, and chlorotrifluoroethylene. Most preferred is a reinforcing yarn prepared from polytetrafluoroethylene (hereinafter often referred to simply as PTFE). The reinforcing yarn may be a monofilament or multifilament yarn having a thickness of from 50 to 400 denier, preferably from 50 to 200 denier. The reinforcing yarn may be a stretched porous PTFE yarn or a PTFE yarn having a compressed cross section which is described in GB-A-No. 2091166 and EP-A-No. 56707.

The sacrificial yarn is not particularly limited as long as it undergoes decomposition, dissolution or the like under the conditions in which the ultimate ion exchange membrane is used, so that it can be removed from the reinforcing strands. The sacrificial yarn may be a conventional monofilament or multifilament yarn prepared from a member selected from the group consisting of synthetic filaments such as a polyester filament, a polyamide filament, an acrylic filament or a polyvinyl alcohol filament and regenerated filaments such as a rayon filament or a cupra filament.

The reinforcing fabric may be manufactured by weaving warp and weft strands prepared from a reinforcing yarn alone or from a reinforcing yarn and a sacrificial yarn. The thread count per inch of the reinforcing fabric depends upon the thickness of the yarn. However, the thread count is generally in the range of from 6 to 50. When the sacrificial yarn is employed, the ratio of the thread count of the sacrificial yarn to that of the reinforcing yarn is in the range of from 1 to 10. If desired, a woven reinforcing fabric may be subjected to heat press treatment prior to use.

As described above, in the present invention, the reinforced in exchange membrane having flat surfaces is obtained by a process which comprises heating an assembly of a first sheet material comprising a support sheet and at least one fluorinated polymer film layer laminated thereto, a second sheet material of a fluorinated polymer film and a woven reinforcing fabric sandwiched between the first sheet material and the second sheet material while applying a negative pressure to one side of the second sheet material that is remote from the fabric at a temperature and for a period of time sufficient to perform encapsulation of the fabric into the film layer of the first sheet material and/or the film of the second sheet material.

The support sheet to be laminated to at least one fluorinated polymer film for obtaining a first sheet material may be made of any of materials which would substantially not be deformed by the heat and pressure to be applied in the step for encapsulation of the fabric, and which exhibit a gas transmission rate of 3 to 200 mmHg, preferably 5 to 50 mmHg, as measured in accordance with Japanese Industrial Standard P-8117-80. It is preferred that the gas transmission rate be in the above range, from the viewpoints of facilitating the removal of air at the time of the application of a negative pressure and the unification of melted polymer films at the time of encapsulation of the fabric. Representative examples of support sheets include a kraft paper, a free sheet, a coated paper and a metal foil. The support sheet as such may be used. Alternatively, the support sheet may have a coating layer attached thereto on the side of the polymer film to be laminated. The coating layer is constituted of a particulate heat resistant material, a release agent, and an adhesive. Examples of heat resistant materials include powders of a metal such as Al, Zn, Mg and Ni, powders of silicon oxide and an oxide of a metal such as Al, Mg, Ni, Sn, Ca, Ba, Cu and Ti, and powders of graphite, clay, sand and an organic polymer such as PTFE. Examples of adhesives include casein, animal glue, fish glue, gelatin, starch, carboxymethylcellulose, polyvinyl alcohol, polyethylene-co-vinyl acetate and acryl copolymers. Examples of release agents include a silicone resin, a paraffin, a wax and PTFE As a preferred example of support sheets having the above-mentioned coating layers thereon, there may be mentioned a sheet described in JP-A-No. 59-94698. The sheet may be obtained by coating a substrate paper such as a kraft paper with a mixture of a particulate heat resistant material such as iron oxide having a particle diameter of 0.1 to 100 $\mu$m, a release agent such as silicone emulsion, and an adhesive such as polyvinyl alcohol.

In the process of the present invention, the above-mentioned assembly of a first sheet material comprising a support sheet and at least one fluorinated polymer film layer laminated thereto, a second sheet material of a fluorinated polymer film and a woven reinforcing fabric sandwiched between the first sheet material and the second sheet material in a manner such that the fabric contacts the polymer film layer of the first sheet material and contacts the polymer film of the second sheet material, is heated while applying a negative pressure to one side of the second sheet material that is remote from the support sheet, thereby effecting encapsulation of the fabric. The apparatus for performing this operation is provided with a mount portion on which the assembly is to be mounted. The mount portion has a vast plurality of tiny throughpaths through which a negative pressure or suction force can be applied by means of a vacuum device to the surface of the polymer film of the second sheet material of the assembly so that the entire assembly is pressed against the mount portion. The apparatus is also provided a heating device capable of heating the assembly. The shape of the mount portion of the apparatus is not particularly limited and may be planar, drum shaped or the like. Hereinbelow, an explanation is given on the process for encapsulating the fabric using an apparatus provided with a planar mount portion.

The first and second sheet materials to be provided in step (1) can be produced as follows.

At least one film of a melt-fabricable fluorinated polymer is laminated to a support as follows. At least one film of a melt-fabricable fluorinated polymer is superimposed on a support sheet. If the support sheet has a coating layer on one surface of the support sheet, the film is superimposed on the support sheet so that the film contacts the coating layer. Then, the resultant assembly is disposed on the planar mount portion of the same apparatus as described above with respect to encapsulation of the fabric so that the support sheet contacts the surface of the mount portion. Then, the assembly is heated while applying a negative pressure to the assembly on the side of the support sheet through the through-paths of the mount portion so as to press the assembly against the mount portion. As a result, the polymer is melted while the air between the support sheet and the film and, if any, between the films is completely removed, thereby preparing a laminated sheet, i.e., first sheet material composed of a support sheet having laminated thereto at least one film layer of a melt-fabricable fluorinated polymer.

In producing a first sheet material, either a single film or a plurality of films of melt-fabricable fluorinated polymers may be used. It is known to use an ion exchange membrane having a plurality of layers of fluorinated polymers as a membrane for chloralkali cells in order to reduce power consumption. For providing a first sheet material to be used in producing such an ion exchange membrane, a plurality of different types of films of melt-fabricable fluorinated polymers may be laminated to a support sheet at once in the above-mentioned manner.

In the above-mentioned lamination step, the air between the film of a fluorinated polymer and the support sheet and between the films of fluorinated polymers escapes through the films and the support sheet.

By the use of a support sheet as mentioned above, the assembly to be fabricated in step (3) does hardly deform under the conditions in which the encapsulation of a woven reinforcing fabric is effected, thereby enabling an ion exchange membrane having a uniform thickness throughout the crossover points and window portions of the membrane to be produced.

It is generally preferred that the bonding strength between the support sheet and the fluorinated polymer film layer be such that the support sheet is not detached from the film layer at the time of the encapsulation of a reinforcing fabric. However, even when the bonding strength is lower than that mentioned above, a significant effect of improving the flatness of the surface of the membrane can be attained due to the action of the support sheet which will not be heat-deformed in the step of the encapsulation of a reinforcing fabric. In the step of the encapsulation of a reinforcing fabric, the support sheet is pressed against the assembly of films of fluorinated polymers and a reinforcing fabric without being deformed and, therefore, causes the pressure applied to the crossover points to be higher than the pressure applied to the window portions, thereby forming a membrane having a uniform thickness throughout the crossover points and window portions of the membrane Alternatively, another form of first sheet material may be employed. In this form of first sheet material, there is employed a support sheet having thereon a coating layer attached to the support sheet. The coating layer is formed by applying a mixture of a particulate heat resistant material, a release agent and an adhesive to one surface of the support sheet. Subsequently, the lamination of the film of a melt-fabricable fluorinated polymer to the support sheet in a manner such that the polymer film contacts the coating layer. The coating layer has a finely roughened surface of a concavo-convex structure and this concavo-convex structure on the surface of the coating layer is transcribed onto the surface of the polymer film layer of the ultimate ion exchange membrane to form thereon a fine concavo-convex structure. The use of an ion exchange membrane having such a fine roughened surface as a membrane in chloralkali cells is especially effective for reducing the power consumption. In the membrane having a fine roughened surface having a concavo-convex structure, it is preferred that the convex have a maximum height of at least 0.05 $\mu$m as determined substantially in accordance with Japanese Industrial Standard B0601 and that there be at least 20 concavo-convex portions per unit length of 1 mm having a roughness of at least 0.05 $\mu$m as determined substantially in accordance with U.S. SAE Standard J911. When electrolysis of an alkali chloride is performed using an electrolytic cell in which a cation exchange membrane having the above-mentioned roughened surface is installed in such a manner that the roughened surface faces the cathode, the cell voltage is remarkable lowered without decrease in current efficiency.

Lamination of at least one film of a melt-fabricable fluorinated polymer to a support sheet is performed under such conditions that the air between the adjacent layers of the assembly can be completely removed, and that the adjacent layers are completely melted. In general, the lamination is performed at a temperature of 220° to 300° C. preferably 230° to 270° C. under a pressure of 30 to 600 mmHg, preferably 60 to 300 mmHg at the surface of the support sheet for 0.5 to 10 min, preferably 1 to 5 min.

The second sheet material consists essentially of the same fluorinated polymer film which is used in the fist sheet material. The method for the production of the fluorinated polymer film as described with respect to the polymer film of the first sheet material can apply to the second sheet material.

In steps (2) and (3) of the process of the present invention, a woven reinforcing fabric is sandwiched between the first sheet material and a second sheet material made of a film of a melt-fabricable fluorinated polymer in a manner such that the fabric contacts the polymer film layer of the first sheet material and contacts the polymer film of the second sheet material, and then encapsulated into the polymer film layer of the first sheet material and/or the polymer film of the second sheet material. The details are as follows.

For example, a porous release paper may preferably be disposed on the planar mount portion of the apparatus as mentioned above. Then, second sheet material, a woven reinforcing fabric and a first sheet material are superimposed on the release paper in this order in such a manner that the polymer film layer of the first sheet material contacts the reinforcing fabric and, accordingly, the support sheet is at the top of the layers. If desired, as long as the thickness of the final membrane does not exceed about 500 μm, another film of a melt-fabricable fluorinated polymer may be superimposed as long as the thickness of the membrane does not exceed about 500 μm, on the second sheet material prior to the superimposition of the reinforcing fabric, and/or on the reinforcing fabric prior to the superimposition of the first sheet material, in order to produce an ion exchange membrane which is improved with respect to current efficiency, cell voltage and chemical and mechanical durabilities. The resultant assembly is heated while applying a negative pressure to one side of the second sheet material that is remote from the support sheet. By this treatment, the fluorinated polymers are melted while the air between the adjacent layers of the assembly is removed, thereby performing encapsulation of the fabric into the polymer film layer of the first sheet material and/or the polymer film of the second sheet material.

The porous release paper which may preferably be used in the encapsulation step preferably has micropores having such a size that substantially no portion of a melted polymer can enter the micropores but the paper has a certain degree of gas transmission. Also, the release paper preferably has at least one surface thereof treated for example, with silicone so as to impart release properties to the surface thereof and to be resistant to the heat applied to the paper during the encapsulation step. A coated paper as described in JP-A-No. 59-94698 may preferably be used as the porous release paper. The gas transmission rate of the porous release paper to be used in the encapsulation step is generally 5 to 200 mmHg, preferably 10 to 50 mmHg.

The encapsulation of the reinforcing fabric may be conducted at a temperature of 200° to 270° C., preferably 220° to 260° C. under a negative pressure of 30 to 600 mmHg, preferably 60 to 300 mmHg for 0.5 to 10 min, preferably 1 to 5 min. The most appropriate temperature, pressure and period of time varies depending on the melt viscosities of the polymers used, the thicknesses of the polymer films and the type of the woven reinforcing fabric. That is, the temperature, pressure and period of time are appropriately controlled within the above-mentioned ranges so that the reinforcing fabric can be completely encapsulated in the fluorinated polymers.

In steps (4) and (5) of the present process, the support sheet is removed to obtain a precursor membrane comprising the polymer film layer derived from the first sheet material, the second sheet material laminated to the polymer film layer, and the reinforcing fabric encapsulated into the polymer film layer and/or the polymer film of the second sheet material. The precursor membrane is subjected to conversion reaction, thereby converting the sulfonyl and/or carboxyl groups of the precursor membrane to sulfonate and/or carboxylate groups. The conversion reaction may be performed in accordance with conventional practices, for example, by hydrolyzing or otherwise chemically modifying the groups.

In the process of the present invention, care must be taken to satisfy the following requirements. First, the thicknesses of the fluorinated polymer films which encapsulate the reinforcing fabric therein are required to be such that the polymer films provide polymers in an amount sufficient to fill the window portions of the woven reinforcing fabric. As the thicknesses of the polymer films become larger, it becomes easier to fill the window portions of the fabric in an amount sufficient to fill the window portions of the woven reinforcing fabric, thus, enabling a membrane having flat surfaces to be obtained easily. However, the use of films having too large a thickness causes the electric resistance of the ultimate membrane to be disadvantageously high and, therefore, is impractical. Accordingly, the thicknesses of the polymer films must be as small as possible within the range in which a membrane having flat surfaces can be obtained. Second, as the thread count per inch of the woven reinforcing fabric is larger, e.g., more than 50, that is, as the distance between the strands of the woven reinforcing fabric becomes smaller, it would be easier to obtain a membrane having flat surfaces. However, because the strands of a woven reinforcing fabric are not permeable to ions, a woven reinforcing fabric having strands arranged at such short intervals has a disadvantageously high electric resistance. Therefore, it would be suitable to use a woven reinforcing fabric having strands arranged at such intervals that the thread count per inch of the woven reinforcing fabric is in the range of from 6 to 50, as mentioned hereinbefore. Further, if the fluorinated polymer films are heated at a high temperature in the encapsulation step, the viscosities of the polymers are reduced, thereby facilitating obtaining of a membrane having flat surfaces. However, the heating of the fluorinated polymers at a high temperature such as more than 270° C. causes critical problems, e.g., an elimination of functional groups from the polymers and disordering of the multi-layer structure of the membrane. Therefore, conducting the encapsulation at too high a temperature should be avoided.

When the production of an ion exchange membrane to be used as membrane for use in chloralkali electrolysis is intended, it is preferred that the fluorinated polymer of the film layer contacting the support sheet be composed of a carboxylate type copolymer prepared from at least one type of monomer selected from the monomers of the above-mentioned groups I and II. In conducing electrolysis using the thus obtained membrane, it is preferred from the viewpoint of power efficiency that the membrane be installed in the cell in such a manner that the side of the membrane having therein carboxylate type exchange groups faces the cathode.

In the case where the fluorinated polymer to be used in the first sheet material and the second sheet material contains only sulfonyl groups, the precursor membrane obtained by encapsulating a reinforcing woven fabric into the two sheet materials may be subjected to surface chemical treatment, thereby converting the sulfonyl groups to carboxyl groups. A method for conducing such chemical treatment is disclosed, for example, in U.S. Pat. No. 4,151,053.

Thus, according to the process of the present invention, there can be obtained an ion exchange membrane having extremely flat surfaces as compared to the conventional ion exchange membrane having a reinforcing fabric incorporated therein. It has not been fully elucidated why a membrane having such flat surfaces can be obtained by the process of the present invention. However, the reason is believed to reside in that the polymer film layer of the first sheet material which is superimposed on the reinforcing fabric is supported by the support sheet which does not substantially deform in the step of the encapsulation of the fabric and that therefore, in the encapsulation step, even when the polymer film layer of the first sheet material is melted and softened, the fall of the polymer film layer into the window portions is prevented, thereby forming extremely flat membrane surfaces. An ion exchange membrane having such flat surfaces has an advantage in that, when chloralkali electrolysis is performed using the membrane in an electrolytic cell, gas bubbles formed in the cell are hardly trapped in the surfaces of the membrane, thereby enabling electric power consumption to be low. By contrast, when the encapsulation of the reinforcing fabric is performed by the conventional method in which any support sheet is not used at the time of heating of the polymer film, the film falls into the window portions due to the differential pressure applied to the surfaces of the film and thus, covers the reinforcing fabric along the concavo-convex contour of thereof. In this case, therefore, a membrane is obtained in which the difference between the thickness of the membrane at the crossover points and that at the window portions is large. When such a membrane having large irregularities is used in the electrotic cell in chloralkali electrolysis, a difficult problem occurs such that the gas bubbles formed in the cell are trapped in the concave portions of the membrane surface, thereby causing electric power consumption to be disadvantageously increased.

As apparent from the foregoing, the ion exchange membrane of the present invention has such a structure such that the difference between the thickness of the membrane at the crossover points where the warp and weft strands cross and the thickness of the membrane at the window portions defined by the crossed warp and weft strands is extremely small, or in other words, extremely flat. Therefore, when the ion exchange membrane of the present invention is used to separate the anode and cathode compartments of a chloralkali cell, electrolysis can be effected without the problems of the gas bubbles being trapped in the membrane surface and that in the membrane, there are areas where the electric resistance would be high, thereby enabling the power consumption to be advantageously reduced.

The saving in power consumption is particularly remarkable when the difference between the membrane thickness at the crossover points and that at the window portions is 35 μm or less. Further, if a gas-and liquid-permeable non-electrode porous layer, such as those disclosed in U.S. Pat. No. 4,552,631 and JP-A-No. 56-112487/1981, is formed on the surface of the present ion exchange membrane, the performance of the membrane can be further improved. The non-electrode layer may be in the form of a thin hydrophilic coating and is ordinarily of an inert electroinactive or non-electrocatalytic substance. Such non-electrode layer should have a porosity of 10 to 99%, preferably 30 to 70%, and an average pore diameter of 0.01 to 1000 microns, preferably 0.1 to 100 microns, and a thickness generally in the range of 0.1 to 500 microns, preferably 1 to 25 microns. The non-electrode layer ordinarily comprises an inorganic component and a binder. The inorganic component may be tin oxide, titanium oxide, zirconium oxide, nickel oxide or an iron oxide such as $Fe_2O_3$ or $Fe_3O_4$.

The present invention will now be described in more detail with reference to the following Examples, which should not be construed as limiting the scope of the present invention.

In the following Examples and Comparative Examples, the following abbreviations are used.

PTFE: polytetrafluoroethylene

TFE/EVE: copolymer of tetrafluoroethylene and methyl perfluoro(4,7-dioxa-5-methyl-8-noneate)

TFE/PSEPVE: copolymer of tetrafluoroethylene and perfluoro(3,6-dioxa-4-methyl-7-octenesulfonyl fluoride)

In the following Examples and Comparative Examples, the thicknesses of a membrane at the crossover points where the warp and weft strands cross and at the window portions defined by the crossed warp and weft strands are measured by taking a photograph of a cross section of the membrane and observing the photograph by a microscope. When the thickness of the membrane at the window portions is not uniform, the smallest thickness is measured.

In the following Examples and Comparative Examples, an apparatus provided with a mount portion on which a sheet-form material is to be mounted, which mount portion has a vast plurality of tiny through-paths through which a negative pressure or suction force can be applied by means of a vacuum device to the surface of the sheet-form material so that the material may be pressed against the mount portion, and also provided with a heating device capable of heating the sheet-form material, is used not only for preparing a first sheet material but also for performing encapsulation of a woven reinforcing fabric into the first and/or second sheet material. This apparatus is hereinafter referred to as "a lamination apparatus".

EXAMPLE 1

A support sheet of a 180 μm-thick kraft paper having one surface thereof coated with a layer consisting of triiron tetroxide, polyvinyl alcohol and silicon, which sheet has a gas transmission rate of 25 mmHg as measured in accordance with Japanese Industrial Standard P-8117-80, is placed on a lamination apparatus in a manner such that the uncoated surface of the support sheet contacts the upper surface of the lamination apparatus. Then, a 25 μm-thick film of a TFE/PSEPVE having an equivalent weight (hereinafter often referred to as "EW") of 1300 and a 90 μm-thick film of a TFE/PSEPVE having an EW of 1080 are superimposed on the support sheet in this order. Subsequently, the support sheet and the two TFE/PSEPVE films are heated at 255° C. for 2 min while applying a negative pressure of 150 mmHg, thereby obtaining a first sheet material consisting of the support sheet and, laminated thereto, the two layers of TFE/PSEPVE having different EWs. The first sheet material is removed, and a porous release paper coated with silicone is placed on the lamination apparatus. Then, a 35 μm-thick film of a TFE/PSEPVE having an EW of 1080 as a second sheet material, a woven reinforcing fabric and the above-obtained first sheet material are superimposed on the release paper in this order in a manner such that the fabric contacts the polymer film layer of the first sheet material that is remote from the support sheet and contacts the polymer film of the second sheet material. The reinforcing fabric used is a fabric which is obtained by weaving PTFE multifilament strands of 200 denier so as to have a thread count of 20 per inch in both the warp and weft directions, followed by processing with a heated roller so that the thickness of the processed fabric is formed to 70 μm. The resultant assembly of the release paper, the second sheet material, the reinforcing fabric and the first sheet material are heated at 248° C. for 4 min, while applying a negative pressure of 150 mmHg to one side of the second sheet material that is remote from the support sheet, thereby performing encapsulation of the reinforcing fabric into the fluorinated polymer films. Thus, there is obtained an ion exchange precursor membrane. The difference between the thickness of the precursor membrane at the crossover points where the warp and weft strands cross and the thickness of the precursor membrane at the window portions defined by the crossed warp and weft strands is 27 μm. The thus prepared ion exchange precursor membrane is treated with an aqueous solution containing 11% by weight of KOH and 30% by weight of dimethyl sulfoxide at 90° C. for 10 hours, thereby converting the functional groups of the precursor membrane to carboxylate and sulfonate ion exchange groups. Thus, there is obtained an ion exchange membrane.

COMPARATIVE EXAMPLE 1

A first sheet material is prepared in substantially the same manner as in Example 1. Then, the support sheet is removed from this sheet material, thereby obtaining a polymer film laminate without a support sheet. An ion exchange precursor membrane is prepared in substantially the same manner as in Example 1 except that the above-obtained polymer film laminate is used in place of the first sheet material having a support sheet attached thereto. The difference between the thickness of the precursor membrane at the crossover points where the warp and weft strands cross and the thickness of the precursor membrane at the window portions defined by the crossed warp and weft strands is as large as 117 μm.

EXAMPLE 2

A first sheet material consisting of a support sheet and, laminated thereto, a polymer film layer having carboxyl groups and a polymer film layer having sulfonyl fluoride groups is prepared in substantially the same manner as in Example 1, except that a 30 μm-thick film of a TFE/EVE having an EW of 1150 is used in place of the 25 μm-thick TFE/PSEPVE film of 1300 in EW, and that the 150 mmHg negative pressure is applied at 243° C. for 3 min. Using this first sheet material, an ion exchange precursor membrane is prepared in substantially the same manner as in Example 1, except that the thickness of the second sheet material is changed to 30 μm, that the thickness of the woven reinforcing fabric is changed to 65 μm, and that the 150 mmHg negative pressure is applied at 235° C. for 3 min. The thus prepared ion exchange precursor membrane is treated with an aqueous solution containing 11% by weight of KOH and 30% by weight of dimethyl sulfoxide at 90° C. for 10 hours, thereby converting the functional groups of the precursor membrane to carboxylate and sulfonate ion exchange groups. Thus, there is obtained an ion exchange membrane. The difference between the thickness of the membrane at the crossover points where the warp and weft strands cross and the thickness of the membrane at the window portions defined by the crossed warp and weft strands is 28 μm.

The thus obtained ion exchange membrane is installed in a transparent electrolytic cell of an acrylic resin in a manner such that the surface of the membrane having carboxylate groups faces the cathode, and electrolysis of sodium chloride is performed in the cell with a current density of 40 A/cm$^2$ and at a temperature of 90° C. An electrode obtained by coating a titanium substrate with ruthenium oxide is used as the anode in the cell, and an electrode made of an iron expanded metal is used as the cathode in the cell. The anode chamber is fed with a 3.5 N brine having a pH value of 2, and the cathode chamber is fed with 30% caustic soda. The cell voltage is 3.40 V, and the current efficiency is 96.5%. Trapping of hydrogen gas bubbles on the surface of the membrane facing the cathode is not observed.

COMPARATIVE EXAMPLE 2

An ion exchange membrane comprising layers having sulfonate groups and a layer having carboxylate groups is prepared in substantially the same manner as in Example 2 except that the support sheet is not used. The difference between the thickness of the membrane at the crossover points and that at the window portions is 117 μm.

Electrolysis of sodium chloride is effected in substantially the same manner as in Example 2 except that the above-obtained ion-exchange membrane is used. The cell voltage is 3.70 V, and the current efficiency is 97%. It is observed that a large number of hydrogen gas bubbles are trapped on the surface of the membrane facing the cathode.

EXAMPLE 3

A porous release paper having a weight of 150 g/m$^2$ and a gas transmission rate of 20 mmHg as a support sheet is placed on a lamination apparatus. Then, a 30 μm-thick film of a TFE/EVE having an EW of 1150 and a 90 μm-thick film of a TFE/PSEPVE having an EW of 1080 are superimposed on the support sheet in this order. The support sheet and the two polymer films are heated at 240° C. for 3 min which applying a negative pressure of 110 mmHg in substantially the same manner as in Example 1, thereby obtaining a first sheet material comprising the substrate sheet and, laminated thereto, the two film layers of fluorinated polymers. The first sheet material is removed, and a porous release paper coated with silicone is placed on the lamination apparatus. Then, a 30 μm-thick film of a TFE/PSEPVE having an EW of 1080 as a second sheet material, a woven reinforcing fabric and the above-obtained first sheet material are superimposed on the release paper in this order in a manner such that the fabric contacts the polymer film layer of the first sheet material that is remote from the support sheet and contacts the polymer film of the second sheet material. The reinforcing fabric used is a fabric which is obtained by weaving PTFE monofilament strands of 200 denier so as to have a thread count of 20 per inch in both the warp and weft directions, followed by processing with a heated roller so that the thickness of the processed fabric is 70 μm. The resultant assembly of the release paper, the second sheet material, the reinforcing fabric and the first sheet material are heated at 235° C. for 3 min while applying a negative pressure of 110 mmHg in substantially the same manner as in Example 1, thereby performing encapsulation of the reinforcing fabric into the fluorinated polymer films. Thus, there is obtained an ion exchange precursor membrane. The thus obtained precursor membrane is treated with an aqueous solution containing 11% by weight of KOH and 30% by weight of dimethyl sulfoxide at 90° C. for 10 hours, thereby converting the functional groups of the precursor membrane to ion exchange groups. Thus, there is obtained an ion exchange membrane. The difference between the thickness of the membrane at the crossover points and that at the window portions is 33 μm.

Electrolysis of sodium chloride is performed in substantially the same manner as in Example 2 except that the above-obtained ion exchange membrane is used. The cell voltage is 3.55 V, and the amount of hydrogen gas bubbles trapped in the surface of the membrane facing the cathode is very small.

EXAMPLE 4

A support sheet having a coating layer as used in Example 1 is placed on a lamination apparatus in a manner such that the uncoated surface of the support sheet contacts the upper surface of the lamination apparatus. Then, a 25 μm-thick film of a TFE/PSEPVE having an EW of 1300 and a 90 μm-thick film of a TFE/PSEPVE having an EW of 1080 are superimposed on the support sheet in this order. The support sheet and the two polymer films are heated at 245° C. for 3 min while applying a negative pressure of 150 mmHg in substantially the same manner as in Example 1, thereby obtaining a first sheet material consisting of the support sheet and, laminated thereto, the two TFE/PSEPVE film layers having different EWs. The first sheet material is removed, and a release paper is placed on the lamination apparatus. Then, a 37 μm-thick film of a TFE/PSEPVE having an EW of 1080 as a second sheet material, a woven reinforcing fabric and the above-obtained first sheet material are superimposed on the release paper in this order in a manner such that the fabric contacts the polymer film layer of the first sheet material that is remote from the support sheet and contacts the polymer film of the second sheet material. The reinforcing fabric used is a fabric which is obtained by weaving PTFE multifilament strands of 200 denier so as to have a thread count of 20 per inch in both the warp and weft directions, followed by processing with a heated roller so that the thickness of the processed fabric is 60 μm. The resultant assembly of the release paper, the second sheet material, the reinforcing fabric and the first sheet material are heated at 240° C. for 4 min while applying a negative pressure of 150 mmHg in substantially the same manner as in Example 1, thereby performing encapsulation of the reinforcing fabric by the fluorinated polymers. Thus, there is obtained a ion exchange precursor membrane. The difference between the thickness of the precursor membrane at the crossover points and that at the window portions is 30 μm.

The thus obtained precursor membrane, at one surface portion of which the EW value is greater than at the other surface portion, is treated with 3N aqueous caustic alkali at 75° C. thereby converting the functional groups of the surface portion up to a depth of 20 μm from the surface to sulfonic acid groups. The thus treated membrane is contacted with gaseous phosphorus pentachloride, thereby converting at least 98% of the sulfonic acid groups to sulfonyl chloride groups. Thereafter, the membrane is treated with hydriodic acid at 90° C., thereby converting the sulfonyl chloride groups to carboxyl groups. Then, the membrane is further treated with an aqueous ethanol solution of a caustic alkali at 70° C., thereby converting all of the functional groups of the membrane to ion exchange groups, thereby obtaining an ion exchange membrane. With respect to the thus obtained membrane, the roughness of the surface having carboxylate groups is measured. The maximum height is 1.3 μm and there are 250 concavo-convex portions with a roughness of 0.05 μm or more per unit length of 1 mm.

Electrolysis of sodium chloride is performed in substantially the same manner as in Example 2, except that the above-obtained ion exchange membrane is used. The cell voltage is 3.35 V, and trapping of hydrogen gas bubbles in the surface of the membrane facing the cathode is not observed.

What is claimed is:

1. A reinforced ion exchange membrane comprising at least two layers of a fluorinated polymer having pendant sulfonate groups, carboxylate groups or a mixture thereof and a woven reinforcing fabric comprising warp and weft strands, said warp and weft strands crossing each other to form crossover points and form window portions defined by the crossed warp and weft strands, said fabric being encapsulated in at least one of said layers,
   wherein the difference between the thickness of the membrane at said crossover points and that at said window portions is sufficiently small to preclude bubble entrapment when in operation within an electrolytic cell.

2. The membrane according to claim 1, wherein surface of at least one layer of the membrane is roughened to have a concavo-convex structure such that the convex has a maximum height of not smaller than 0.05 μm and in which there are at least 20 concavo-convex portions per unit length of 1 mm each having a roughness of not smaller than 0.05 μm.

3. The membrane according to claim 1, wherein at least one surface of said membrane has a gas- and liquid permeable porous non-electrode layer attached thereto.

4. The membrane according to claims 1 or 2, wherein said warp and weft strands each comprise a perfluoroolefin polymer and each have a thickness of from about 50 to about 400 denier.

5. The membrane according to claim 1, wherein the thickness of the membrane is in the range of from about 50 to 500 μm.

6. The membrane according to claim 1, wherein the thickness of the membrane is in the range of from about 150 to 250 μm.

7. The membrane according to claim 1, wherein the difference between the thickness of the membrane at said crossover points and that at said window portions is not greater that 35 μm.

8. A process for producing a reinforced ion exchange membrane comprising the steps of:

(1) providing a first and a second sheet material, said first sheet material comprising a support sheet and, laminated thereto, at least one film layer of a melt-fabricable fluorinated polymer having pendant sulfonyl and/or carboxyl groups in a melt-fabricable form, said second sheet material comprising a film of a melt-fabricable fluorinated polymer having pendant sulfonyl and/or carboxyl groups in a melt-fabricable form;

(2) sandwiching a woven reinforcing fabric comprising warp and weft strands between said first sheet material and said second sheet material in a manner such that the fabric contacts the polymer film layer of the first sheet material and contacts the polymer film of the second sheet material, said warp and weft strands crossing each other to form crossover points and from window portions defined by the crossed warp and weft strands;

(3) heating the resultant assembly of the first sheet material, the fabric and the second sheet material while applying a negative pressure to one side of the second sheet material that is remote from the support sheet, thereby performing encapsulation of the fabric into the polymer film layer of said first sheet material, the polymer film of said second sheet material or the film of each of said first sheet material and said second sheet material;

(4) removing said support sheet from the assembly, thereby obtained a precursor membrane comprising the polymer film layer derived from said first sheet material, said second sheet material laminated to said polymer film layer and said reinforcing fabric encapsulated into said polymer film layer of said first sheet material, the polymer film of said second sheet material or the film of each of said first sheet material and said second sheet material, wherein the difference between the thickness of the membrane at the crossover points and that at the window portions is sufficiently small to preclude bubble entrapment when in operation within an electrolytic cell; and (5) converting the sulfonyl groups, carboxyl groups or a mixture thereof of the precursor membrane to sulfonate groups, carboxylate groups or a mixture thereof.

9. The process according to claim 8, wherein said support sheet has a coating layer attached thereto on the side of said polymer film layer of said first sheet material, said coating layer comprising a particulate heat resistant material, a release agent and an adhesive.

10. The process according to claim 8, wherein the encapsulation of the fabric is conducted at a temperature of from 200° to 270° C., under a negative pressure of 30 to 600 mmHg and for 0.5 to 10 min.

11. The process according to claim 8, wherein the encapsulation of the fabric is conducted at a temperature of from 220° to 260° C., under a negative pressure of 60 to 300 mmHg and for 1 to 5 min.

12. The process according to claim 8, wherein in step (4), the difference between the thickness of the membrane at the crossover points and that at the window portions is not greater than 35 μm.

* * * * *